Feb. 19, 1924.                                                                  1,484,548
W. O. BICKERSTAFF
BLOWER ATTACHMENT
Filed June 7, 1923                     2 Sheets-Sheet 1
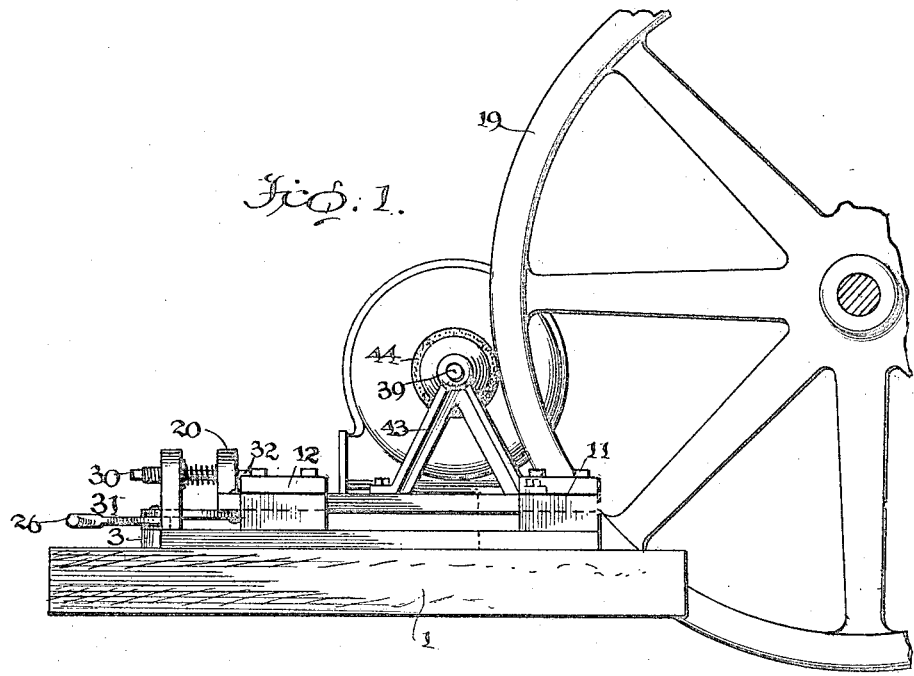
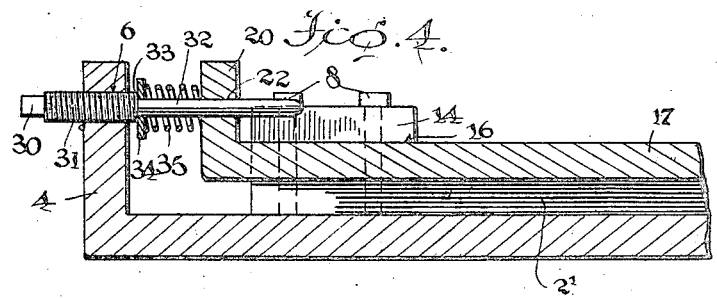
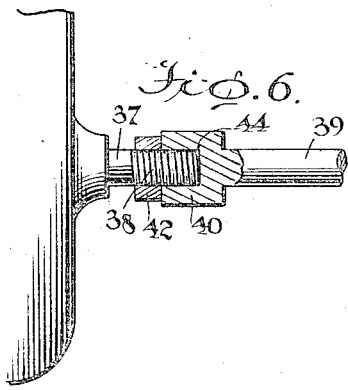
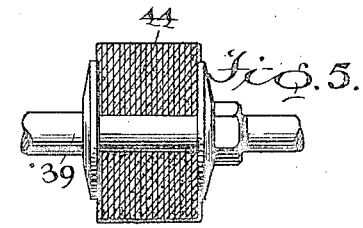
INVENTOR.
W. O. Bickerstaff,
BY
Geo. P. Kimmel
ATTORNEY.

Feb. 19, 1924.
W. O. BICKERSTAFF
BLOWER ATTACHMENT
Filed June 7, 1923
1,484,548
2 Sheets-Sheet 2
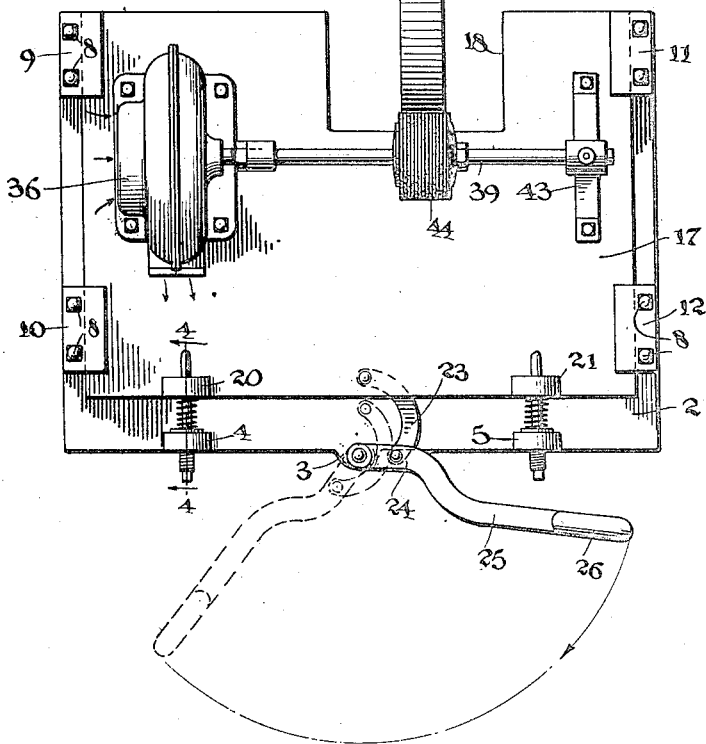
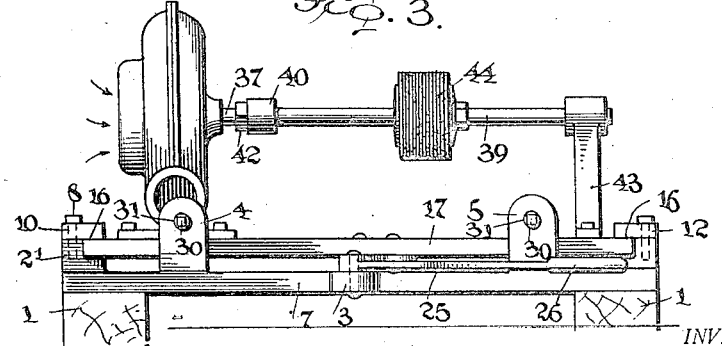
INVENTOR.
W. O. Bickerstaff,
BY
ATTORNEY.

Patented Feb. 19, 1924.

1,484,548

UNITED STATES PATENT OFFICE.

WILLIAM O. BICKERSTAFF, OF SMITHVILLE, WEST VIRGINIA.

BLOWER ATTACHMENT.

Application filed June 7, 1923. Serial No. 644,067.

*To all whom it may concern:*

Be it known that I, WILLIAM O. BICKERSTAFF, a citizen of the United States, residing at Smithville, in the county of Ritchie and State of West Virginia, have invented certain new and useful Improvements in Blower Attachments, of which the following is a specification.

This invention relates to a blower attachment designed primarily for use in connection with blowers where gas engines are employed for drilling wells, but it is to be understood that a blower attachment in accordance with this invention can be employed for any purposes wherein it is found applicable, and the invention has for its object to provide, in a manner as hereinafter set forth, a blower attachment including spring controlled means whereby the operating shaft for the blower is normally maintained in operative relation with respect to a driving element therefor and further including means whereby the operating shaft of the blower can be shifted clear of such driving means to discontinue the operation of the blower when occasion so requires.

Further objects of the invention are to provide a blower attachment, in a manner as hereinafter referred to, which is simple in its construction and arrangement, strong, durable, thoroughly efficient and convenient in its use, readily installed in operative relation with respect to the engine, and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a blower attachment in accordance with this invention, and further showing the adaptation thereof in connection with the fly wheel of the engine.

Figure 2 is a top plan view of the blower attachment.

Figure 3 is a side elevation.

Figure 4 is a section on line 4—4, Figure 2.

Figure 5 is a fragmentary view, in section, of the driving pulley.

Figure 6 is a fragmentary view, partly in section, of the driving shaft for the blower.

Referring to the drawings in detail, 1 denotes a pair of supports or timbers upon which is fixed, in any suitable manner, a rectangular base plate 2, provided at one side with an outwardly projecting apertured ear 3 and said base 2, at that side provided with the ear 3, is formed with a pair of vertically extending lugs 4, 5, each having near its upper end an opening 6, having a threaded wall. The lugs 4 and 5 are disposed at right angles with respect to the ear 3, and the lug 4 is arranged between the center and one end of the side edge 7, and the lug 5 is positioned between the center and the other end of said edge 7. The base 2 has formed upon its upper face, at each end thereof an L-shaped rib 2' forming a combined guide and support to each of which is secured, by the hold-fast devices 8, a pair of retaining plates. The plates secured to one rib are indicated at 9, 10, and the plates secured to the other rib are indicated at 11, 12. Said plates in connection with the ribs form guide passages 16. The plates 9 and 10 are spaced from each other and the plates 11 and 12 are also spaced from each other. The plates 9 and 10 are oppositely disposed with respect to the members 11 and 12. The plates 10 and 12 are positioned at a point between the center and one side of a rib 2', but the plates 9 and 11 are flush with the inner side edge of the base 2. The plates 9, 10, 11 and 12 are flush with the end edges of the base 2. The hold-fast devices extend through the ribs 2', the base 2 and through the said plates, as shown in Figure 4.

Mounted in the opposed combined guide and supporting members is a shiftable platform 17, which is rectangular in contour, and of less length and of less width than the length and width of the base 2. The ends of the platform 17 extend into the guide passages 16, and said platform is supported upon the ribs 2' whereby the platform 17 is spaced from the base 2. The platform 17 is shiftably positioned within the combined guide and supporting members. When the platform 17 is in normal position, its inner side edge is flush with the inner side edge of the base 2, and said platform 17, as well as the base 2, has the inner side cut away to provide a clearance 18. The clearances in the platform 17 and base 2 normally register with each other and said clearances are provided for the fly wheel 19 of the engine, so that the fly wheel can engage and operate the driving shaft of the blower to be presently referred to.

The platform 17 at its outer side is formed with a pair of vertically extending lugs 20, 21, and which are in alignment with the lugs 4, 5, respectively, and the lug 20 as well as the lug 21 is provided with an opening 22, which is in alignment with the opening 6. The outer side of the platform 17 has pivotally connected therewith one end of a curved link 23, and the latter has its outer side pivotally connected to the offset inner portion 24, of a lever arm 25. The inner end of the lever 25 is pivoted to the ear 3. The lever 25 is disposed horizontally. The lever 25 has its outer end provided with a handle 26 and said lever 25 is employed for shifting the platform 17 towards the outer side of the base 2, for a purpose to be hereinafter referred to. When the lever 25 is shifted to the dotted line position in Figure 2, it locked the platform.

Extending through the aligning lugs 4 and 20 is a combined support and spring tensioning element, and extended through the aligning lugs 5 and 21 is a combined support and spring tensioning element. Each of said elements consists of a polygonal-shaped outer portion 30, a peripherally threaded intermediate cylindrical portion 31 and a cylindrical inner portion 32, which is of less diameter than the portion 31, thereby providing the element intermediate its ends with a shoulder 33. The threaded portion 31 of the elements engages with the threaded wall of the opening 6, and the inner portion 32 of the element extends through the opening 22. Positioned on the element and abutting against the shoulder 33, is a disk 34 which constitutes an abutment, and mounted on the cylindrical portion 32 and interposed between the abutment 34 and a lug 20 or 21, is a coiled spring 35. The threaded portions 31 of the elements provide means for adjusting the tension of springs 35 and the function of the springs 35 is to maintain the platform 17 in a position whereby the inner side of the platform 17 will align with the inner side of the base 2, or in other words, in the position as shown in Figure 2 so that the blower operating shaft will be operatively engaged with the fly wheel 19. The platform 17 is shifted towards the outer side of the base 2, by the lever 27 and such shifting is had against the action of the springs 35. Each of the combined supporting and spring tensioning elements is of a length as to permanently project outwardly from a lug 4 or 5 and to permanently extend inwardly with respect to a lug 20 or 21.

Connected to the platform 17, near one end thereof, is a blower 36, having the shaft thereof indicated at 37 and which is extended from the body of the blower and peripherally threaded, as at 38. The driving shaft for operating the blower is indicated at 39, and which is enlarged at one end, as at 40, and the said enlarged end is provided with a socket 41, having a threaded wall with which engages the threaded portion 38 of the shaft 37. A lock nut 42 engages with the shaft 37 and abuts against the enlarged end of the shaft 39. The manner of setting up the shaft 37 with respect to the shaft 39 provides a detachable connection therebetween and which enables the disconnecting of the shaft 39 from the blower 36. The shaft 39, at its other end, is mounted in a suitable bearing 43, which is secured to the platform 17 near the other end thereof. Secured to the shaft 39, intermediate the ends thereof is a frictional driving pulley 44 and which frictionally engages with the fly wheel 19 for the purpose of driving the shaft 39, thereby operating the blower 36. The pulley 44 is normally maintained in engagement with the fly wheel 19 through the action of the springs 35, and said pulley 44 is shifted clear of the fly wheel 19 when the lever is actuated to shift the platform 17 to the outer side of the base 2, and is retained clear of the fly wheel 19 when the platform is locked.

Although the preferred embodiment of the invention is as described and illustrated, yet it is to be understood that changes in the details of contruction can be had which will fall within the light of the invention as claimed.

What I claim is:—

1. A blower attachment comprising a base, a spring controlled platform arranged over, spaced from and slidably connected with said base, controlling springs for said platform, a lever pivotally connected to the outer side of the base and with the outer side of the platform for shifting the latter in one direction against the action of the platform controlling springs, a blower operating shaft mounted on said platform and provided at one end with means for connecting it with a blower for operating the same, and a frictional driving pulley carried intermediate the ends of said shaft.

2. A blower attachment comprising a base, a spring controlled platform arranged over, spaced from and slidably connected with said base, controlling springs for said platform, a lever pivotally connected to the outer side of the base and with the outer side of the platform for shifting the latter in one direction against the action of the platform controlling springs, supporting means for positioning said controlling springs between the outer sides of the base and platform and with the springs bearing against the platform, a blower operating shaft mounted on said platform and provided at one end with means for connecting it with a blower for operating the same, and a frictional driving pulley carried intermediate the ends of said shaft and adapted to be engaged by a driving means to provide for the operation of said shaft, the said controlling springs of said platform normally maintaining said pulley in frictional contact with such driving means.

3. A blower attachment comprising a base, a spring controlled platform arranged over, spaced from and slidably connected with said base, controlling springs for said platform, a lever pivotally connected to the outer side of the base and with the outer side of the platform for shifting the latter in one direction against the action of the platform controlling springs, a blower operating shaft mounted on said platform and provided at one end with means for connecting it with a blower for operating the same, a frictional driving pulley carried intermediate the ends of said shaft and positioned by the action of the platform controlling springs to be engaged by a driving means to provide for the operation of said shaft, and adjustable elements connected with the base and platform for supporting and increasing or decreasing the tension of the controlling springs for said platform.

4. A blower attachment comprising a base, a spring controlled platform arranged over, spaced from and slidably connected with said base, controlling springs for said platform, a lever pivotally connected to the outer side of the base and with the outer side of the platform for shifting the latter in one direction against the action of the platform controlling springs, a blower operating shaft mounted on said platform and provided at one end with means for connecting it with a blower for operating the same, a frictional driving pulley carried intermediate the ends of said shaft and adapted to be engaged by a driving means to provide for the operation of said shaft, the said controlling springs of said platform normally maintaining said pulley in frictional contact with such driving means, and adjustable elements connected to the base and platform for supporting and increasing or decreasing the tension of the controlling springs for said platform.

5. A blower attachment comprising a base, a platform slidably connected therewith and mounted thereover, a blower operating means carried by said platform and including a shaft provided with a friction driving pulley normally in frictional engagement with a driving means therefor, adjustable combined supporting and spring tensioning elements connected with the outer side of said platform and base, platform controlling springs carried by said elements interposed between the outer sides of the platform and base and normally maintaining said pulley in frictional contact with its operating means, and means connected with the outer sides of the platform and base for shifting the platform in one direction against the action of said controlling springs.

6. A blower attachment comprising a rectangular base, a rectangular platform arranged thereover and slidably connected therewith, said base and platform having their outer sides formed with pairs of aligning lugs, the lugs of the platform spaced from the lugs of the base, a blower operating means carried by said platform and including a shaft provided with a friction driving pulley normally in frictional engagement with a driving means therefor, an adjustable combined supporting and spring tensioning element extending through each pair of aligning lugs and adjustably engaging with the lugs of the base, platform controlling springs interposed between the aligning lugs and carried by said elements and normally maintaining said pulley in frictional contact with its operating means, a lever having one end pivotally connected to the outer side of said base, and a curved link pivotally connected to said lever and to the outer sides of said platform and providing means in connection with the lever for shifting the platform in one direction against the action of said controlling springs.

In testimony whereof, I affix my signature hereto.

WILLIAM O. BICKERSTAFF.